United States Patent [19]
Ware et al.

[11] 3,775,145

[45] Nov. 27, 1973

[54] CORRUGATED PAPERBOARD ADHESIVE

[75] Inventors: Franklyn O. Ware; Alan M. Hill, both of Lawrence, Kans.

[73] Assignee: Lawrence Paper Company, Lawrence, Kans.

[22] Filed: Sept. 23, 1971

[21] Appl. No.: 183,218

[63] Continuation of Ser. No. 141,198, May 7, 1971

[52] U.S. Cl.................. 106/150, 106/153, 106/213
[51] Int. Cl. ........................ C08b 25/02, C08h 7/00
[58] Field of Search.................... 106/150, 210, 157, 106/213, 153

[56] References Cited
UNITED STATES PATENTS

| | | | |
|---|---|---|---|
| 3,251,703 | 5/1965 | Fortney et al. | 106/150 |
| 3,578,475 | 5/1971 | Alexander et al. | 106/150 |

OTHER PUBLICATIONS

Kerr, "Chemistry and Industry of Starch," 2nd Edition, Academic Press, Inc., New York, N.Y., 1950, pp. 596–598.

*Primary Examiner*—Allan Lieberman
*Attorney*—I. William Millen

[57] ABSTRACT

Novel viscosity stable corrugating adhesives having a carrier portion, e.g., cooked starch paste or a cooked flour paste having similar viscosity and flow characteristics, and a slurry portion containing flour having a particle size less than 100 mesh, and containing from 0.25 – 1.8 borax and 0.5 – 3.0 caustic, calculated on total solids, in amounts sufficient to provide the requisite initial tack and desired gel point to the adhesive but less than that which renders the adhesives viscosity unstable.

19 Claims, No Drawings

CORRUGATED PAPERBOARD ADHESIVE

BACKGROUND OF THE INVENTION

This invention relates to novel flour-containing adhesives and to their use in the preparation of corrugated paperboard. This application is a continuation-in-part of application Ser. No. 141,198, filed May 7, 1971.

In the production of corrugated paperboard, the adhesive conventionally employed to bond the corrugated liner to the facing sheets is a Stein-Hall starch-based adhesive in which about five-sixths of the starch is in the form of an uncooked aqueous starch suspension which is brought to the desired viscosity and provided with the requisite tack by a cooked starch past, which also acts as a carrier to maintain the uncooked starch in suspension. The cooked portion is prepared separately and then blended with the uncooked starch slurry, which conventionally also contains caustic soda, to reduce the gelation time and temperature of the uncooked starch, and borax, to increase the tack of the adhesive. See U.S. Pat. Nos. 3,151,996 and 2,833,662. The starch is ordinarily cooked in a conventional manner, i.e., batch-wise by heating an aqueous slurry so as to gradually bring the temperature of the slurry to gelation temperature. Several processes have also been developed for cooking the starch slurry substantially instantaneously. See U.S. Pat. Nos. 2,717,213; 3,133,836; 3,228,781; 3,308,037; and 3,450,549. U. S. Pat. No. 3,228,781 employs such an instantaneous starch cooking method in the production of a Stein-Hall corrugated board adhesive. See also U.S. Pat. No. 2,609,326.

Because the viscosity of the final adhesive can be regulated by varying the proportion of cooked starch paste in the adhesive, the starch paste is not conventionally subjected to a viscosity-reducing enzyme treatment, in contradistinction to paper sizes where the use of enzyme converted starch is conventional. See, e.g., U.S. Pat. Nos. 3,149,049 and 3,450,549. Processes for the production of corrugated board adhesive are, however, known in which a portion of the starch is enzyme converted. In U.S. Pat. No. 2,258,741, a portion only of the gelatinized starch is enzyme converted. In U.S. Pat. No. 2,824,037, enzyme or acid is employed as a gelatinizing agent. In U.S. Pat. No. 3,163,549, flour is converted to starch by eliminating the proteinaceous portion thereof with a proteolytic enzyme.

Because of the obvious economic advantages which would result if a flour-containing adhesive could be produced which performed satisfactorily in commercial production, considerable effort has been directed to the production of a commercially acceptable flour-based adhesive. See U.S. Pat. Nos. 2,051,025; 2,102,937; 2,212,557; 2,291,586; 2,466,172; 2,520,597; 2,881,086; 2,999,028; 3,163,549; and 3,251,703.

Bauer, U.S. Pat. No. 2,051,025 claims a process for forming corrugated paperboard employing as adhesive the mixture of gelatinized flour or starch and an ungelatinized portion as a carrier claimed in U.S. Pat. No. 2,102,937. However, this process, known as the Stein-Hall process, as developed and as widely used commercially today, employs starch exclusively. Bauer U.S. Pat. No. 2,212,557 discloses a potential adhesive composition which employs as a carrier a hydrosol of silica, alumina or magnesia, a natural gum, or one comprising gluten.

Galber and Dike, U.S. Pat. No. 2,291,586 discloses the use of a seedmeal flour-based adhesive for making plywood under heat and pressure.

As pointed out by Kesler and Hicks, U.S. Pat. No. 2,466,172, when uncooked flour is employed as an adhesive, no adhesive value is obtained from the starch portion of the flour and when the flour is cooked to gelatinize the starch fraction, the product is unsatisfactory for many uses and the starch becomes modified in a non-uniform manner due to the natural enzymes in the flour, resulting in a product of variable viscosity. The patentees state that prior efforts to use flour as an adhesive have, therefore, not been uniformly satisfactory commercially. That patent claims a process for avoiding non-uniformity by inactivating the natural enzymes in the flour at a pH of about 9–10 at about 56° C. prior to cooking.

Griffin, U.S. Pat. No. 2,520,597 approaches the problem of the adverse effect of the natural enzymes in flour in the usual cooking operation by instantly raising the flour slurry to a cooking temperature of 200°–212° F. by dispersing the slurry in a large volume of boiling water. This dilution technique produces a low-solids paste suitable for use as a textile size.

Wimmer, U.S. Pat. No. 2,881,086 states that when corn flour is substituted for corn starch in the process of U.S. Pat. No. 2,051,025, the resulting material is very difficult to handle in large scale equipment for several reasons, one being the thixotropic character of the adhesive. Wimmer's claimed solution to the problem is the use of paste formed from an esterified flour as the carrier. The chemical cost associated with this approach offsets much of the economic advantage of the use of flour instead of starch.

Horner, U.S. Pat. No. 2,999,028 also discusses the thixotropic disadvantage of the use of flour-based adhesives and states that consequently flours, as such, are not ordinarily practical for corrugating machine operation. That patent states that this disadvantage is avoided by the use of a gelatinized waxy starch or flour consisting essentially of 100 percent amylopectin as the cooked carrier portion of Stein-Hall type corrugating adhesive. Such flours are not standard commercial grades of flour and thus not widely and continuously available at prices which would make their use instead of conventional starch particularly attractive, assuming all other production factors were equal.

Vollnik and Hunt, U.S. Pat. No. 3,163,549 states that the protein in flour is detrimental to the properties of adhesives produced therefrom and claim a process in which a substantial portion of the protein of the flour is broken down prior to cooking the flour with a proteolytic enzyme having little amylolytic activity. This, of course, eliminates the possibility of achieving any adhesive effect from the protein present in flour.

Fortney and Hunt, U.S. Pat. No. 3,251,703 also states that prior attempts to use grain flours for the corn starch used in the Stein-Hall process have not been successful. The patent notes that the thixotropic character and high viscosity of an adhesive formed from flour instead of starch precludes its use. When the proportion of gelatinized flour is reduced to overcome these effects, the resultant lowered viscosity and tackiness results in waste and unsatisfactory bonding. Their approach to the problem is the use as the uncooked portion of a finely ground flour of a specific particle size and quality. As pointed out at Col. 4, line 71 to Col. 5, line 4, even these finely ground flours cannot be used as a direct substitute for starch in a conventional Stein-Hall corrugating adhesive paste. They found that such flours could be used if certain gums, dry blended with the flour, were used as the carrier portion. However, most, if not all, corrugating plants are set up to use cooked starch paste as a carrier portion which is blended with the raw slurry after its preparation.

For other art on the treatment of flour, starch, and processes for producing adhesives, see U.S. Pat. Nos. 1,911,400; 2,197,754; 2,222,306; 2,609,326; 2,657,163; 2,894,859; 3,029,192; 3,073,724; 3,137,639; 3,175,928; 3,251,748; 3,200,360; 3,337,414; 3,423,239; 3,434,901; and 3,490,922.

Notwithstanding the fact that flour-based adhesives adapted for use as the bonding agent in the preparation of corrugated paperboard have been known for over 35 years, flour-based adhesives have not received acceptance in the corrugating industry, except during wartime shortages of starch, and today starch-based adhesives are used almost exclusively. It is believed there is no substantial use today of a chemically unmodified flour-based adhesive in the corrugating industry. With the production difficulties associated with the use of a flour-based adhesive, has made a flour-based adhesive an unattractive alternative to an all-starch adhesive.

It has now been found that according to the process of this invention raw flour can be used successfully on a commercial scale in a corrugated paperboard adhesive without the disadvantages of the prior art attempts to produce such an adhesive. With the novel adhesives of this invention, corrugated paperboard of the same quality as that produced using a conventional starch-based adhesive can be produced at the same equipment speeds and the same rate of adhesive consumption, with the resultant economies realized from using flour instead of starch.

OBJECTS OF THE INVENTION

It is an object of this invention to provide novel flour-based adhesives. Another object is the provision of such an adhesive which can be employed in corrugating plants designed to use a conventional starch paste-starch slurry adhesive without substantial modification of equipment or processing techniques. A further object is the provision of a process for the production of corrugated paperboard employing the novel adhesives of this invention. Other objects will be apparent to those skilled in the art to which this invention pertains.

SUMMARY OF THIS INVENTION

The novel adhesives of this invention are viscosity-stable flour-based adhesives having as a cooked carrier portion a cooked starch paste or cooked flour paste which is a smooth, stable homogeneous colloidal co-solution of both the protein and starch fractions of the flour, the protein fraction being present in substantially non-degraded form and the starch fraction being present essentially as chemically unmodified starch or as molecular weight reduced starch which is otherwise chemically unmodified, and having a slurry portion containing a flour particle size less than 100 mesh and containing 0.25–1.8 percent borax and 0.5–3 percent caustic, calculated on total solids, in amounts sufficient to provide the requisite initial tack and desired gel point to the adhesive but less than that which renders the adhesives viscosity unstable. In its process aspect, this invention relates to processes for the production of corrugated paperboard employing these novel adhesives.

DETAILED DISCUSSION

The adhesives of this invention are the Stein-Hall type, i.e., they have a carrier portion and a slurry portion, the ratio of carrier portion to slurry portion usually ranging from about 2:3 to 6:1, preferably about 1:1 to 5:1, based on total solids, the exact proportion being determined by the carrier employed and the viscosity and tack desired in fianl adhesive. A flour as defined herein, rather than starch, is employed in the slurry portion.

The flours operable in the novel adhesives of this invention have a particle size of at least about 80 percent less than 100 mesh, i.e., no more than about 20 percent is retained on a 100 mesh sieve.

It was believed in the prior art that the protein in flour was responsible for the thixotropic properties of Stein-Hall type adhesives which used flour in the uncooked portion (See U.S. Pat. No. 3,251,703, Col. 5, lines 1–6). We have found that the protein content of conventional flours has little, if any, effect upon the operability of a flour in the uncooked portion of a Stein-Hall adhesive. Far more important is the particle size of the flour and the amount of borax and caustic employed in the finished formulation.

This fact is confirmed by the physical and chemical analyses of air classfied mill grade corn flour and reduction flour, i.e., the fines obtained as a by-product in th manufacture of brewer's grits from corn.

Mill grade corn flour was air classified using a 36 inch Double Wall Double Wizzer mechanical air separator (Combustion Engineering, Inc., Raymond Div., Chicago, Ill.). Passing mill grade corn flour through the air classifier with its fines adjusted to give a 50:50 separation yielded a dark, i.e., coarse, fraction and a light, i.e., fine, fraction. The latter can be employed as the uncooked portion of the adhesives of this invention.

In order to increase the proportion of the light fraction, the dark fraction was again passed through the air separator, yielding another approximately 50:50 dark and light fraction, the latter being mixed with the light fraction obtained from the first pass through the equipment, yielding a 70–75 percent light fraction and a 25–30 percent dark fraction. The light fraction was used in preparing the uncooked portion of a Stein-Hall type adhesive, after adjusting its viscosity by varying the solids content of the cooked portion and the caustic and borax content of the finished adhesive. This adhesive performed as well or better than a conventional Stein-Hall starch based adhesive.

Since the protein in flour was believed in the prior art to be responsible for the thixotropic properties of Stein-Hall type adhesives when flour is substituted for starch in the uncooked portion, it was assumed the successful use of the light fraction of the air classified mill grade corn flour was due to the reduction in the protein content thereof. Surprisingly, the light fraction had about the same protein content as the dark fraction. The difference in the two fractions appeared to be more physical than chemical in nature, i.e., the light fraction consisted almost entirely of particles of which passed through a 140 sieve, i.e., about 88 percent passed through a 250 sieve.

To determine whether other flours of a relatively fine particle size could also be substituted for cornstarch, reduction flour was substituted directly for corn starch in the uncooked portion of a Stein-Hall type corrugating adhesive. With appropriate reduction in borax and caustic to compensate for its increased viscosity, the adhesive performed perfectly in a long run on production equipment. This result was most surprising, in view of the teaching of U.S. Pat. No. 3,251,703 that corn flour more finely ground than reduction flour could not be used in a conventional Stein-Hall corrugating adhesive because of its protein content. It now appears that the failure of that flour in a Stein-Hall adhesive was not due to its protein content but was due to the failure of the patentees to make the necessary reduction in borax and caustic contents in the finished formulation we have found to be required in order to avoid the setback and thixotropy observed by the patentees when finely ground flour is substituted for starch in a conventional Stein-Hall adhesive.

Reduction flour was also air classified into light and dark fractions in the manner described above. The screen analysis of these flours is set forth in the table below.

| Sieve No.[1] | Corn Flour Air Classified 30% Dark Fraction | Corn Flour Air Classified 70% Light Fraction | Reduction Flour Non-Fractionated | Reduction Flour Air Classified 30% Dark Fraction | Reduction Flour Air Classified 70% Light Fraction |
|---|---|---|---|---|---|
| 60 | 0.3% | 0.0% | 1.2% | 3.4% | 0.2% |
| 80 | 26.2% | 0.0% | 6.0% | 17.8% | 1.0% |
| 100 | 58.9% | 0.8% | 13.0% | 36.8% | 2.8% |
| 140 | 3.1% | 1.2% | 11.1% | 17.2% | 8.6% |
| 200 | 7.6% | 5.2% | 39.4% | 14.6% | 50.0% |
| 250 | 0.9% | 4.4% | 0.7% | 1.4% | 0.4% |
| >250 | 1.3% | 88.0% | 27.3% | 6.0% | 36.4% |

[1] retained

It can be seen from these data that the flours which can be employed in the adhesives of this invention have a particle size at least about 80 percent of which is smaller than 100 mesh. The light portion of air fractionated flours, which are preferred, are relatively low in content of particles larger than about 115 microns, i.e., less than 15 percent is retained on a 140 sieve. In the case of the air classified corn flour, the light fraction consists essentially of extremely small particles, i.e., smaller than about 75 microns, so that less than 10 percent is retained on a 200 mesh screen.

The flour used in the adhesives of this invention is preferably a corn flour. However, any other flour, e.g., milo, wheat, buckwheat, rye, barley, oat or other grain flour can be used.

Although the protein content of the flour is not critical and is usually determined by the particular flour employed, it will be apparent that the starch/protein ratio of the flour pastes of this invention can be regulated by the use or addition of a material having a protein content higher than grain flours, e.g., soybean flour, gluten, corn feed, or lower than grain flours, e.g., corn, wheat, rice or tapioca starch. The addition of a starch, e.g., pearl grade cornstarch or a comparable wheat starch obviously will not affect the operability of the adhesive, since these starches are conventionally employed instead of flour, but the economic advantage of employing flour instead of starch will be proportionately reduced.

The flour is employed in the slurry portion of the adhesives of this invention at about the same solids concentration as that of a conventional starch-based Stein-Hall adhesive. The exact concentration is determined partially by the proportion and concentration of the carrier portion and partially by the equipment employed. On the single facer, a formulation which provides about an 18–25 sec. Zahn cup viscosity is preferably employed. On the double backer, a more viscous adhesive, e.g., having a viscosity of about 20–30 sec., is usually desired. Generally a total solids content of about 15–35 percent, preferably about 20–30 percent, by weight is desired.

An integral aspect of the use of a flour as defined herein in the viscosity stable composite adhesives is the amount of borax and caustic present in the finished adhesive. Whereas substantial amounts are used in a conventional starch-based adhesive, e.g., 2–3 percent of each, calculated on starch solids when flour is used in the uncooked portion, these amounts produce a viscosity-unstable finished adhesive. This is readily seen when using reduction flour in the uncooked portion. When conventional amounts of caustic and borax are employed, the finished adhesive retrogrades to an unusable very viscous mass which does not beocme fluid again on stirring. However, when the amount of caustic and borax is reduced to an amount below that which imparts the requisite tack and gel temperature to a starch-based adhesive of the same solids content, a viscosity stable adhesive results which has as good or better adhesion than a standard starch-based Stein-Hall adhesive.

The borax and caustic are employed in the novel adhesives of this invention in substantially lesser amounts than the amounts employed in conventional Stein-Hall type corrugated paperboard adhesives. From 0.25 1.8 percent, preferably 0.5 – 1.7 percent, calculated on total solids, of borax is employed to regulate tack and 0.5 – 3 percent, preferably 1.5 – 2.6 percent, calculated on total solids, of caustic soda or other alkali is employed to regulate gelation temperature. Generally speaking, about 50–75 percent of the borax and 75–90 percent of the caustic employed in a conventional Stein-Hall adhesive of the same solids content, the exact amount generally being inversely proportional to the solids content of the adhesive.

The sensitivity of the adhesive to borax and caustic is also proportionate to the particle size of the flour and the solids content of the finished adhesive. For example, the light fraction of air classified corn flour, because of its finer particle size, can be more readily adapted to use at the double backer station, which conventionally employs a higher solids content adhesive, than the coarser reduction flour. Generally, the adhesive employed on the double backer should contain flour consisting at least about 95 percent of particles smaller than 100 mesh, preferably smaller than 140 mesh. On the single facer, a coarser flour, e.g., conventional corn reduction flour, can be employed in the adhesive because the solids content of the adhesive can be reduced to the point where the amounts of borax and caustic needed to provide the requisite tack and gel temperature can be employed without imparting setback or a permanent increase in viscosity to the adhesive.

Although caustic soda is ordinarily employed in the adhesives of this invention to reduce the gel point thereof, other equivalent caustic alkaline agents can also be used for this purpose, e.g., potash, sodium silicate, etc. Similarly, although borax is the preferred borate salt, equivalent amounts of other borate salts of the di-, hypo-, meta-, ortho-, per-, pyro- and tetra-borates can also be used.

As in a conventional Stein-Hall adhesive, the adhesives of this invention have a carrier portion, usually cooked starch, which maintains the uncooked portion in suspension. In the adhesives of this invention, starch, e.g., common mill grade corn starch, is ideally suited for this purpose. However, other functionally equivalent hydrophillic gels can be employed, e.g., the novel flour pastes described in our patent application Ser. No. 141,198, filed May 7, 1971, also can be employed as the carrier portion of the adhesives of this invention. These flour pastes are produced by cooking a flour slurry in a manner in which the resulting paste is a smooth, stable homogeneous colloidal co-solution of at least a predominant portion of both the protein and starch fractions of the flour, the protein fraction being present in substantially non-degraded form and the starch fraction being present essentially as chemically unmodified or molecular weight reduced starch. In such a physical condition, the flour paste imparts surprisingly advantageous properties to carrier-slurry composite adhesives which employ such a flour paste as a carrier. Such a flour paste can be produced by cooking the flour slurry substantially instantaneously at temperatures above cooking temperatures conventionally employed when cooking flour while subjecting the slurry to a high degree of agitation and shearing action in excess of that required for uniform blending. For apparatus suitable for imparting this excess mechanical energy, see U.S. Pat. Nos. 2,609,326; 2,717,213; 3,228,781; 3,308,037; 3,133,836; 3,337,414; and 3,450,549. A particular useful method employs steam to provide the requisite shearing force, using the cooking apparatus of U.S. Pat. No. 3,211,564 or 3,133,836. Because the flour slurry mixes with the steam as they both pass through a highly restricted orifice or orifices, the steam and slurry are mixed at extremely high velocities thereby imparting the mechanical energy necessary to break up the flour particles and produce a smooth, homogeneous co-solution of both the protein and starch fractions of the flour. Usually all or substantially all, e.g., at least 90 percent of the protein and the starch fractions of the flour are dissolved, the protein being present in substantially nondegraded form and the starch being present essentially as chemically unmodified or as molecular weight reduced starch. At high temperatures and/or in the presence of very large amounts of excess mechanical energy, e.g., provided by steam in excess of that required to bring the slurry to the desired cooling temperature as described in U.S. Pat. No. 3,133,836, all of the flour particles, including the fibrous particles, are dissolved, thus producing a clear, transparent solution. At lower temperatures and/or lower levels of mechanical stress not all of the fibrous fraction is solubilized so that the paste is no longer transparent but still has a characteristic creamy, smooth texture which is quite dissimilar from conventional flour pastes.

For another example of equipment used to subject the flour slurry to a high shearing force, see U.S. Pat. No. 2,526,599. High mechanical energy can also be provided with an ultrasonic disintegrator, e.g., the Branson "sonifier" (Heat Systems Co., 60 Broad Hollow Road, Melville, N.Y.). Adding air, heated to a temperature which offsets the cooling effect by evaporation of the water in the slurry, to the steam employed in U.S. Pat. No. 3,211,564, will increase the velocity of the flour slurry through the orifices of the cooking apparatus, thereby providing a higher shearing force. Compressed air instead of steam, if heated sufficiently to provide the requisite heat to bring the slurry to the desired cooking temperature, will also increase the shearing force achieved in the apparatus of U.S. Pat. No. 3,211,564.

The cooking temperature required to produce the cosolution which characterizes the novel flour pastes varies inversely with the mechanical energy provided during the cooking step, e.g., about 115° to about 175° C. or even higher, preferably about 120° to 165° C., more preferably about 140° to 160° C. A cooking temperature is employed which results in substantially instantaneous cooking of the flour so as to ensure that no significant degradation of the proteinanceous fraction of the flour occurs. The use of injected steam to heat the slurry to the desired temperature is preferred because of the rapidity at which cooking temperature can be reached.

As stated above, if the slurry is subjected to sufficient mechanical energy while being cooked, a clear, transparent paste is produced. A lesser amount of energy produces a smooth, creamy semi-opaque paste. Both can be readily distinguishable by touch from the granular textured flour pastes prepared in a conventional manner. The novel pastes are colored, including yellow (corn), pale violet (milo) and brown (wheat).

After cooking, the flour paste is cooled as rapidly as possible to below cooking temperature, e.g., 20°–80° C. Because of their viscosity, cooling by indirect means is inefficient and direct cooling is preferred. A convenient technique is releasing the hot paste into an evacuated chamber maintained at a partial pressure which cools the hot paste to the desired temperature by evaporation.

To produce a finished corrugated paperboard adhesive, the carrier portion, the flour slurry, borax and caustic can be blended in the same manner conventionally employed to produce Stein-Hall type adhesives. A convenient method is to add the caustic to the hot cooked starch paste, which after partial cooling is then mixed with the flour slurry, the borax being added to the slurry portion or to the finished adhesive.

Important factors affecting the commercial operability of the flour-based adhesives of this invention which are not problems with starch-based adhesives are their microbiological instability and their foam-forming characteristics. Because of its protein content, the flour-based adhesives of this invention are more susceptible than starch adhesives to bacterial, fungal or yeast degradation. Therefore, a preservative should be added if the adhesive is not used within 8–12 hours after cooking below 140° C., e.g., formaldehyde, the Dowacides, or any other preservative conventionally employed to inhibit microbiological activity.

The protein content of the novel adhesives also renders them more susceptible than a corresponding starch-based adhesive to foaming due to circulation through the adhesive pans. Such foaming markedly alters the pick-up and glue pattern on the flutes. However, a small, e.g., about 0.01 petcent, amount of a conventional defoaming agent for aqueous protein-containing mixtures, e.g., animal petroleum and vegetable oils, silicones, non-ionic surfactants, sulfonated castor and other oils, low-molecular weight polyethylenes, octyl and nonyl alcohols, etc., readily counteracts this foaming tendency.

The following are typical compositions of carrier and slurry portions which are blended to form the adhesives of this invention:

| Cooked Carrier Portion | | Uncooked Slurry Portion | |
|---|---|---|---|
| Corn starch* | 30–40 lb. | Corn flour** | 300–400 lb. |
| Caustic | 3–9lb. | Borax | 3–11 lb. |
| Water (35 gal.) | 290 lb. | Water (120 gal.) | 1,000 lb. |
| * pearl grade | | **air fractionated 98 % 140 mesh; 92% 200 mesh; 88% 250 mesh | |

A typical finished composition consists of about 70–90 percent, preferably about 75 – 82 percent water and contains about 30–10 percent, preferably about 18 – 25 percent solids, consisting essentially of about 70 – 90 percent, preferably about 75 – 85 percent uncooked flour; about 0.25 – 1.8 percent, preferably 1.0 – 1.5 percent, borax; about 0.5 – 3 percent, preferably about 1.5 – 2.6 percent caustic soda; about 0.3 percent formaldehyde and about 0.03 percent anti-foaming agent.

The adhesives of this invention can be prepared and used in the production of corrugated paperboard in substantially the same manner as conventional starch-based Stein-Hall adhesives, with appropriate regulation of carrier to slurry ratio.

Without further elaboration, it is believed that one skilled in the art can, using the preceding description, utilize the present invention to its fullest extent. The following preferred specific embodiments are, therefore to be construed as merely illustrative, and not limitative of the remainder of the disclosure in any way whatsoever.

EXAMPLE 1

Carrier and slurry portions of the following composition were prepared:

| Cooked Carrier Portion | | Uncooked Slurry Portion | |
|---|---|---|---|
| Corn Starch | 116 lb. | Reduction Flour | 600 lb. |
| Water | 50 gal. | Water | 175 gal. |
| Caustic (in 3 gal. water) | 13 lb. | Borax | 10 lb. |
| cooling water | 35 gal. | | |

The uncooked flour slurry and the cooked starch paste are combined in a 5.2 to 1 ratio (solids).

EXAMPLE 2

The procedure of Example 1 is followed, except that instead of reduction flour, air classified straight mill corn flour having a particle size of which 88 percent is smaller than 250 mesh and 98 percent is less than 140 mesh, with less than 1 percent larger than 100 mesh, is employed in the uncooked slurry portion.

EXAMPLE 3

A flour slurry is prepared using 600 pounds of reduction flour and 10 pounds of borax in 175 gallons of water. This is blended with a carrier prepared in the manner described in Ser. No. 141,198 by instantaneously cooking a stream of a slurry of 90 pounds of reduction flour in 40 gallons of water in a Hydroheater at 155° C. using theoretical steam, cooling and then blending with 10 pounds of caustic soda in about 1.5 gallons of water followed by 35 gallons of cooling water. One gallon of formalin is then added to the finished adhesive along with the water required to bring the viscosity to 20–+seconds.

EXAMPLE 4

An adhesive comparable to that described in Example 3 is prepared by forming in the secondary tank a slurry of 1,200 pounds of reduction flour in 400 gallons of 45° C. water containing 17 pounds of borax dissolved therein. The carrier is prepared by pumping a 2.5 lb./gal. slurry of reduction flour through a Hydroheater at 155° C. at 6 gal./min. for eight minutes. (120 lbs. solids; 48 gal.). The cooked paste is mixed with 21 pounds of caustic soda in 3 gallons of water in the primary tank, held for 10 minutes and then cooled by mixing with 70 gallons of cooling water. The cooled paste is dropped into the secondary tank and blended with the slurry. One gallon of formalin and one cup cup L-61 Pluronic defoamer (Wyandotte Chem. Corp., Wyandotte, Mich. is then added and the viscosity adjusted to 18–22 seconds. This adhesive has been used at the single facer station (average pick-up, 0.75 gal./1,000 square feet) to produce over 50 million square feet of corrugated paperboard which is comparable in all respects to corresponding board prepared with a conventional pearl starch Stein-Hall adhesive.

EXAMPLE 5

An adhesive suitable for use on either the single facer or double backer is produced according to the process of Example 4 by substituting pearl starch for the reduction flour in the carrier portion. Percent carrier and percent total solids are adjusted in the finished adhesive to a final viscosity of 18–25 seconds for the single facer and 20–30 seconds for the double backer, with 26 pounds of caustic being used in the latter.

Similarly, the dark fraction of air fractionated straight mill corn flour (99 percent 60 mesh, 73 percent 80 mesh, 13 percent 100 mesh), cooked in the manner described in Example 5, can be substituted for the reduction flour in the carrier portion.

The preceding examples can be repeated with similar success by substituting the generically or specifically described reactants and/or operating conditions of this invention for those used in the preceding examples.

From the foregoing description, one-skilled in the art can easily ascertain the essential characteristics of this invention, and without departing from the spirit and scope thereof, can make various changes and modifications of the invention to adapt it to various usages and conditions.

What is claimed is:

1. In a composite adhesive for the commercial production of corrugated paperboard having as a cooked carrier portion a cooked starch paste or cooked flour paste which is a smooth, stable homogeneous colloidal co-solution of both the protein and starch fractions of the flour, the protein fraction being present in substantially non-degraded form and the starch fraction being present essentially as chemically unmodified starch or as molecular weight reduced starch which is otherwise chemically unmodiefied and having an uncooked slurry portion and containing borax and caustic, the improvement wherein there is employed in the slurry portion an uncooked grain flour having a particle size at least about 80 percent less than 100 mesh and the borax and caustic are employed in amounts from 0.25 – 1.8 percent and 0.5 – 3.0 percent, respectively, calculated on total solids, sufficient to impart the requisite tack and provide the desired gel point but less than an amount which renders the adhesive viscosity unstable.

2. An adhesive according to claim 1 containing 0.5 – 1.7 percent borax, calculated on total solids.

3. An adhesive according to claim 1 containing 1.5 – 2.6 percent caustic soda calculated on total solids.

4. An adhesive according to claim 1 wherein the uncooked flour has a particle size at least 95 percent of which is 140 mesh.

5. An adhesive according to claim 1 wherein the carrier portion is a cooked starch paste.

6. An adhesive according to claim 1 wherein the flour in the slurry portion is a corn flour.

7. An adhesive according to claim 6 wherein the carrier portion is a cooked starch paste.

8. An adhesive according to claim 6 wherein the corn flour in the slurry portion is a reduction flour.

9. An adhesive according to claim 6 containing 0.5 – 1.7 percent borax and 1.5 – 2.6 percent caustic soda, calculated on total solids.

10. An adhesive according to claim 9 wherein the carrier portion is a cooked starch paste.

11. An adhesive according to claim 9 wherein the uncooked flour has a particle size at least 95 percent of which is 140 mesh.

12. An adhesive according to claim 11 wherein the carrier portion is a cooked starch paste.

13. An adhesive according to claim 1 wherein the carrier portion is a cooked flour paste which is a smooth, stable homogeneous colloidal co-solution of both the protein and starch fractions of the flour, the protein fraction being present in substantially non-degraded form and the starch fraction being present essentially as chemically unmodified starch or as molecular weight reduced starch which is otherwise chemically unmodified.

14. An adhesive according to claim 13 wherein the starch fraction of the carrier portion is present essentially as chemically unmodified starch.

15. An adhesive according to claim 13 wherein the flour of the cooked flour paste is corn flour.

16. An adhesive according to claim 13 wherein the uncooked flour has a particle size at least 95 percent of which is 140 mesh.

17. An adhesive according to claim 13 wherein the flour in the slurry portion is a corn flour.

18. An adhesive according to claim 17 containing 0.5 – 1.7 percent borax and 1.5 – 2.6 percent caustic soda, calculated on total solids.

19. An adhesive according to claim 18 wherein the uncooked flour has a particle size at least 95 percent of which is 140 mesh.

* * * * *